(12) United States Patent
Ventura (10) Patent No.: US 12,485,810 B2
(45) Date of Patent: Dec. 2, 2025

(54) MODULAR HUMANLESS SHOPPING STRUCTURE

(71) Applicant: Trismegistus LLC, Newark, DE (US)

(72) Inventor: Hermes Jeshua Ventura, Greensboro, NC (US)

(73) Assignee: Trismegistus LLC, Newark, DE (US)

( * ) Notice: Subject to any disclaimer, the term of this patent is extended or adjusted under 35 U.S.C. 154(b) by 404 days.

(21) Appl. No.: 18/304,107

(22) Filed: Apr. 20, 2023

(65) Prior Publication Data

US 2024/0351506 A1 Oct. 24, 2024

(51) Int. Cl.
| | |
|---|---|
| *B60P 3/025* | (2006.01) |
| *A47F 10/00* | (2006.01) |
| *A47F 10/02* | (2006.01) |
| *G06Q 20/12* | (2012.01) |

(52) U.S. Cl.
CPC .............. *B60P 3/025* (2013.01); *A47F 10/02* (2013.01); *G06Q 20/12* (2013.01); *A47F 2010/005* (2013.01)

(58) Field of Classification Search
CPC .... B60P 3/025; A47F 10/02; A47F 2010/005; G06Q 20/12; G06Q 20/18; G06Q 20/20; G06Q 20/208; G07C 9/20; G07G 1/0036; G07G 1/0054; G07G 1/0063
See application file for complete search history.

(56) References Cited

U.S. PATENT DOCUMENTS

| | | | |
|---|---|---|---|
| 7,348,884 B2 | 3/2008 | Higham | |
| 8,485,434 B2 | 7/2013 | Waltman | |
| 11,227,270 B2 * | 1/2022 | Ahmed | ................ G06Q 20/14 |
| (Continued) | | | |

FOREIGN PATENT DOCUMENTS

| | | |
|---|---|---|
| CN | 107284332 A | 10/2017 |
| KR | 102343194 B1 | 12/2021 |

OTHER PUBLICATIONS

POM Peace of Mind Technologies; "Why Your Business May Need a Panic Button" available at "https://pom-tec.com/blog/why-your-business-may-need-a-panic-button/"; 4 pages.

(Continued)

*Primary Examiner* — A. Hunter Wilder
(74) *Attorney, Agent, or Firm* — Briggs Intellectual Property Law; Jeremy A. Briggs (57) ABSTRACT

A modular shopping structure is disclosed. The modular shopping structure may include a compartment configured to store a plurality of items, and a plurality of wheels disposed at a compartment bottom portion. The modular shopping structure may further include a compartment docking unit configured to move the compartment between a compartment elevated position and a compartment docking position. The modular shopping structure may further include a sensor and a processor. The sensor may be configured to detect a user purchase action associated with an item, when the compartment is in the compartment docking position. The processor may obtain information associated with the item when the sensor detects the user purchase action, determine a cost associated with the item based on the information, and transmit a command signal to a third party payment module to deduct the cost from an account associated with a user.

16 Claims, 7 Drawing Sheets

(56) References Cited

U.S. PATENT DOCUMENTS

| | | |
|---|---|---|
| 11,361,686 B2 | 6/2022 | Garden et al. |
| 11,462,065 B1 | 10/2022 | Ogram |
| 2018/0260778 A1 | 9/2018 | Mazetti et al. |
| 2019/0185081 A1* | 6/2019 | Kamm ................. B62D 63/061 |

OTHER PUBLICATIONS

New Atlas; "Rivian's "Camp Mode" auto-levels the vehicle for a good night's rest"; available at "https://newatlas.com/automotive/rivians-camp-mode-auto-levels-vehicle/"; 12 pages.

ACS Publications; "Atmospheric Water Harvesting: A Review of Material and Structural Designs" available at "https://pubs.acs.org/doi/10.1021/acsmaterialslett.0c00130"; 14 pages.

* cited by examiner

MODULAR HUMANLESS SHOPPING STRUCTURE

TECHNICAL FIELD

The present disclosure relates to a modular human-less shopping structure, and more specifically to a shopping structure that may move from one location to another and may enable a user to purchase an item seamlessly.

BACKGROUND

Typically, a firm or an individual spend considerable time and effort in setting-up a physical shopping/retail store. The physical shopping store may provide better shopping experience to customers as compared to online shopping. For example, the customers may look and feel the products before buying them.

While a physical shopping store may provide benefits to the customers, a storeowner is typically required to expend considerable investment in setting-up the store. If the footfall to the store is not substantially high and the demand for the items is less, the storeowner may not get returns on the investment. In such scenarios, the storeowner may plan to shift the store to a location where the footfall may be expected to be high. However, shifting a physical shopping store may be an effort-intensive task and may require substantial re-investment from the storeowner. This may cause inconvenience to the storeowner.

Thus, there exists a need for a system that may facilitate easy shifting/movement of physical shopping store from one location to another.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a modular human-less shopping structure that may be fully autonomous and may be configured to move from a first location to a second location. The modular shopping structure may include a compartment configured to store multiple items/commodities, and a plurality of wheels disposed at a compartment bottom surface. The plurality of wheels may enable the modular shopping structure to move from the first location to the second location. The modular shopping structure may further include a compartment docking unit that may move the compartment between a compartment elevated position and a compartment docking position. For example, the compartment docking unit may position the compartment in the compartment elevated position when the modular shopping structure may be moving, and may position the compartment in the compartment docking position when the modular shopping structure may have reached a destination location (e.g., the second location). In the compartment elevated position, the plurality of wheels may touch ground, and the compartment may rest on the ground via the plurality of wheels. In the compartment docking position, the plurality of wheels may not touch the ground, and the compartment may rest on the ground via a support structure that may be disposed at the compartment bottom surface.

In some aspects, the compartment may include camera(s) and/or sensors that may be configured to detect user purchase actions associated with the items stored in the compartment. For example, the camera(s) and sensors may detect the items picked by the user from compartment shelves. When the camera(s) and sensors detect a user purchase action, the camera(s) and sensors may transmit a signal to a control system that may be disposed in the modular shopping structure. Responsive to obtaining the signal, the control system may determine item name and cost, and trigger payment from an account associated with the user. In this manner, the modular shopping structure may enable seamless and physical checkout-free shopping experience to the user.

In further aspects, the compartment may include one or more emergency buttons, e.g., a panic button and a medical emergency button. The user may actuate/press the emergency buttons when the user may feel uncomfortable/unsafe or may be in a medical emergency. The control system may receive inputs from the emergency buttons when the user presses the emergency buttons, and may perform one or more predefined actions responsive to receiving the inputs. For example, the control system may lock the compartment when the user presses the panic button, so that no intruder may enter the compartment. The control system may further call police when the user presses the panic button. In a similar manner, the control system may call ambulance and/or generate a medical emergency alert when the user presses the medical emergency button.

The present disclosure discloses a modular shopping structure that may be easily moved using integrated wheels. The modular shopping structure may be fully autonomous, human-less, contact-less retail store that may provide seamless and checkout-free shopping experience to the user. The user may enter the shopping structure, pick items, and leave without waiting in payment queue (for scanning and making the payment). In addition, the modular shopping structure may provide secure environment to the user. The modular shopping structure may include security glasses (e.g., impact-free glasses) that may allow the user to see from inside of the compartment to the outside, and vice versa.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

Figure 1:
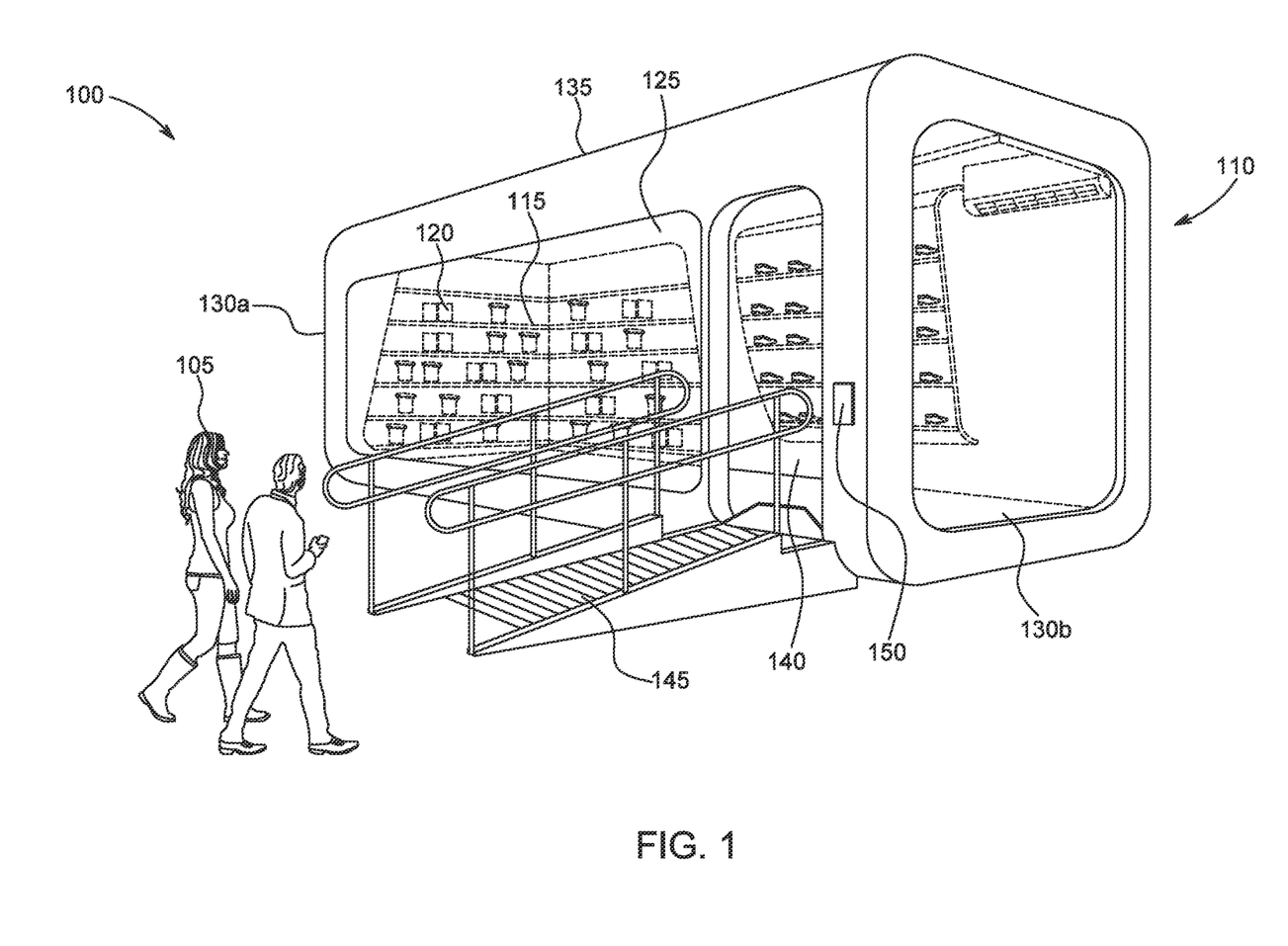
FIG. 1 depicts an example modular shopping structure in accordance with the present disclosure.

FIG. 1 depicts an example modular shopping structure 100 in accordance with the present disclosure. The modular shopping structure 100 may be human-less and contact-less retail store that may enable a user 105 to enter, collect items, and exit the modular shopping structure 100 without interacting with any human being. Thus, the modular shopping structure 100 may provide a checkout-free shopping experience to the user 105. In addition, the modular shopping structure 100 may be a movable shopping structure that may be easily moved from one location to another.

The modular shopping structure 100 may include a compartment 110. The compartment 110 may include a plurality of shelves 115 in a compartment interior portion. The plurality of shelves 115 may be configured to store/display a plurality of items 120 that the user 105 may collect/pick after entering the compartment 110. The plurality of items 120 may include, but is not limited to, dairy products, bakery products, fast moving consumer goods, and/or other grocery items. In an exemplary aspect, each item 120 may have an associated barcode that may be printed on an item cover.

The compartment 110 may be of any shape and size. For example, the compartment 110 may be shaped as a cube or a cuboid, having length, width and/or height in range of 10 to 40 feet. Compartment walls and the plurality of shelves 115 may be made of any material including, but not limited to, aluminum, steel, 3D recycled plastic with Hard-Coat (Passive) Low-E Coatings glass, fiber, and/or the like. In some aspects, compartment exterior body may be made of carbon fiber to minimize corrosion maintenance cost and weight.

Figure 3:
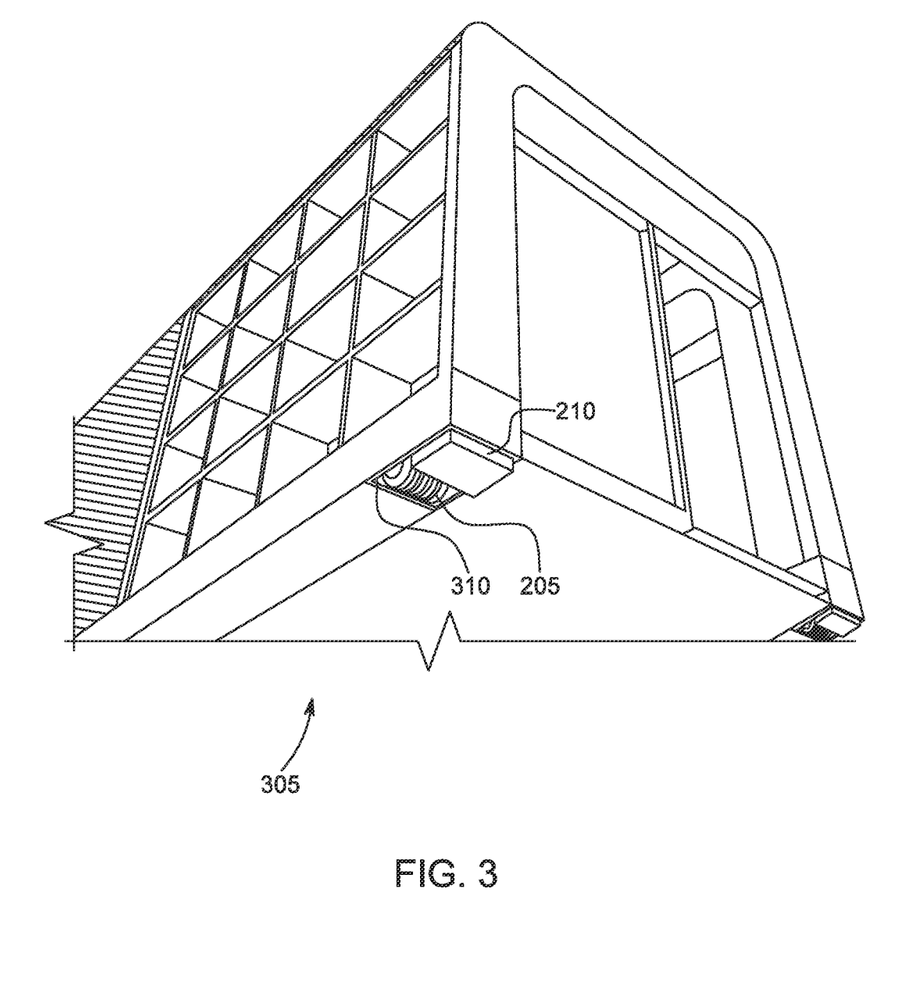
FIG. 3 depicts an example compartment bottom portion in accordance with the present disclosure.

The compartment 110 may include a front portion 125, a back portion (shown as compartment back portion 405 in FIG. 4), side portions (e.g., a first side portion 130a and a second side portion 130b), a top portion 135, and a bottom portion (shown as a compartment bottom portion 305 in FIG. 3). In some aspects, the compartment 110 may include security glass and transparent walls disposed in an entire area or select parts of the front portion 125 and/or the side portions 130a, 130b. The security glass and transparent walls may enable the user 105 to easily see through the compartment 110 from outside to inside when the user 105 may be located outside the compartment 110, and vice-versa. In some aspects, the back portion may also include security glass. The security glass may be impact-proof, such that the glass may not break when an object hits the glass. In further aspects, the top portion 135 may include solar panels that may be configured to generate electricity by using solar energy. The electricity may be used to activate various compartment components including, but not limited to, air conditioners, lights, display devices, water tanks, compartment transceiver (shown as transceiver 610 in FIG. 6), alarms, and/or the like. In some aspects, the compartment 110 may include long term installation plug that may supply water, electricity, and/or the like to the modular shopping structure 100.

The compartment 110 may include an entry area 140 (or an entry door 140) to enter the compartment 110, and an exit area (not shown) to exit the compartment 110. In some aspects, the entry area 140 may be located at the front portion 125 (e.g., corner of the front portion 125), as shown in FIG. 1. In other aspects, the entry area 140 may be located at the first side portion 130a or the second side portion 130b. Similarly, the exit area may be located at the first side portion 130a, the second side portion 130b, or the back portion. The entry area 140 and the exit area may be disposed in the compartment 110 such that the user 105 may enter from one compartment side and exit from another compartment side. For example, the entry area 140 may be located at the first side portion 130a and the exit area may be located at the second side portion 130b.

The modular shopping structure 100 may further include an inclined ramp 145 that may be removably attached to the compartment 110. The inclined ramp 145 may connect ground to a compartment bottom portion (towards the entry area 140). The user 105 may walk on the inclined ramp 145 to easily enter the compartment 110. The inclined ramp 145 may further provide wheelchair access to the user 105. In some aspects, the inclined ramp 145 may be integrated with the compartment 110, and may be configured to be retracted inside the compartment 110 when the inclined ramp 145 may not be in use (e.g., when the modular shopping structure 100 may be moving or closed for maintenance/repair).

The present disclosure is not limited to the modular shopping structure 100 having the inclined ramp 145. Stated another way, in some aspects, the modular shopping structure 100 may not include the inclined ramp 145.

In some aspects, the compartment 110 may further include an access control device 150 that may be disposed/located in proximity to the entry area 140, as shown in FIG. 1. The access control device 150 may be configured to provide access to the user 105 to enter and use the compartment 110. In some aspects, the access control device 150 may be configured to allow access to a set of users registered ("registered users") with the modular shopping structure 100 or a server associated with the modular shopping structure 100. In some aspects, a registered user (such as the user 105) may use a user device (shown as user device 602 in FIG. 6) to access the compartment 110 by using the access control device 150. The user device may be a communication device, such as a mobile phone, a smart phone, a smart watch, a personal digital assistant (PDA), a tablet computer, or any other similar device with communication capabilities.

In an exemplary aspect, the user device may include an application ("app") that may interact with the access control device 150 to provide access to the compartment 110. The user device may communicate with the access control device 150 by using Radio-frequency identification (RFID) technology. Stated another way, the access control device 150 may include an RFID reader that may "read" an RFID tag that may be displayed on a user device display screen via the application. To request access to the compartment 110, the user 105 may position the user device in proximity to the access control device 150. Responsive to the user 105 positioning the user device in proximity to the access control device 150, the access control device 150 may read the corresponding RFID tag and authenticate the user device. The access control device 150 may then provide access to the user 105 to enter the compartment 110 based on the authentication. In some aspects, the entry area 140 may be in a closed default position, and may automatically open when the user 105 scans the user device at the access control device 150. In other aspects, the user 105 may access the compartment 110 by using an RFID card, instead of the user device. In further aspects, the access control device 150 may be configured to provide access to the user 105 based on facial recognition technology (using cameras or security system installed in the compartment 110). In further aspects, the access control device 150 may be configured to perform vehicle identification recognition such that the modular shopping structure 100 may interact with the vehicle and vice versa (e.g., when the modular shopping structure 100 may not be moving).

The compartment 110 may further include one or more emergency buttons (not shown) that may be disposed in the compartment interior portion. For example, the compartment 110 may include a panic button and a medical emergency button that may be disposed inside the compartment 110. The user 105 (e.g., a female user) may actuate/press the panic button when the user 105 may feel unsafe in the compartment 110. Responsive to the user 105 actuating the panic button, the entry area 140 and the exit area of the compartment 110 may be locked and a person (e.g., an intruder) standing outside the compartment 110 may not enter the compartment 110. In additional aspects, the compartment 110 may make a call to a third party (e.g., police) via a network (shown as network 606 in FIG. 6) and a compartment transceiver, when the user 105 actuates the panic button.

In a similar manner, the user 105 may actuate/press the medical emergency button when the user 105 may be in a medical emergency. When the user 105 presses the medical emergency button, the entry area 140 and/or the exit area may not be locked, and the compartment 110 may generate an alarm to get attention of nearby medical resources and/or make a call to another third party (e.g., an ambulance) via the network and the compartment transceiver.

The compartment 110 may include additional components (not shown) including, but not limited to, camera(s) (that may capture video feed inside and outside the compartment 110), sensor(s) (including proximity sensors, motion sensors, RFID readers, etc.), microphones, display systems/screens (that may display captured video feeds and/or advertisements), and/or the like. In some aspects, the display systems may include light-emitting diode (LED) screens that may be disposed along a top portion of the transparent walls in the compartment interior portion. The LED screens may display 360—view of outside world to the user 105 (inside the compartment 110) by using one or more external cameras that may be located at a compartment exterior portion. The LED screens may assist the user 105 to see those views (e.g., back views) which may not be visible from inside the compartment 110. In additional aspects, the display system may include LED screens that may be disposed at the compartment exterior portion. Such exterior LED screens may display notifications (e.g., in different colors) based on the button pressed by the user 105. For example, the exterior LED screens may display an emergency notification when the user 105 actuates one or more emergency buttons. Further, the exterior LED screens may illuminate in different arrangements based on whether the store is open, closed, rebooting, etc. The exterior LED screens may be further configured to display advertisements, information (e.g., discounts) associated with items stored on the plurality of shelves 115, and/or the like.

The compartment 110 may further include a memory (shown as memory 614 in FIG. 6) that may be configured to store camera feeds from compartment interior and exterior cameras for evidence purposes.

The modular shopping structure 100 may further include a control system (shown as control system 600 in FIG. 6) that may be configured to control modular shopping structure movement and manage the inventory (i.e., the plurality of items 120) in the compartment 110. For example, the control system ("system") may be configured to trigger modular shopping structure movement, select/control vertical positioning of the modular shopping structure 100 (e.g., move between a compartment elevated position and a compartment docking position, described in detail below in conjunction with FIGS. 2A and 2B), and/or the like.

In addition, the system may be configured to determine item(s) picked by the user 105 from the plurality of shelves 115, determine cost of picked item(s), and deduct the cost from an account associated with the user 105. Specifically, the system may obtain inputs from the compartment interior camera(s) and/or sensors (e.g., RFID readers) installed in the compartment 110, and may use the inputs to determine the items picked by the user 105 from the plurality of shelves 115.

In some aspects, the compartment interior camera(s) and the sensors may be configured to detect a user purchase action (e.g., when the compartment 110 may be in compartment docking position) associated with the items (e.g., a first item of the plurality of items 120) picked by the user 105, and provide inputs corresponding to the user purchase action to the system. The user purchase action may be, for example, the user 105 picking the first item from the shelves 115, and placing the first items in a shopping cart or a shopping bag. The inputs may include video feeds or other information, e.g., item identifiers, which may enable the system to determine the item(s) picked by the user 105.

Responsive to obtaining the inputs from the compartment interior camera(s) and the sensors, the system may determine the first item picked by the user 105 and then determine/calculate cost associated with the first item. For example, the system may retrieve cost associated with the first item from the memory. Responsive to determining the cost associated with the first item, the system may transmit a command signal to a third party payment module to deduct the cost from an account associated with the user 105. In this manner, the user 105 may not be required to scan or wait in queue for check-out process. The user 105 may enter the compartment 110, collect the item(s) that the user 105 desires to purchase, and leave the compartment 110 with the items. The cost of items picked/collected by the user 105 may be automatically deducted from the user's account, thus providing seamless shopping experience to the user 105.

The modular shopping structure 100 may further include a plurality of wheels (shown as wheels 205 in FIG. 2A) disposed at a compartment bottom portion (shown as compartment bottom portion 305 in FIG. 3). The plurality of wheels may be configured to move the modular shopping structure 100/the compartment 110 from a source location to a destination location. In an exemplary aspect, the modular shopping structure 100 may include four wheels, one wheel at each modular shopping structure/compartment corner. Further, the modular shopping structure 100 may include any powertrain such as, for example, a gasoline engine or diesel engine, one or more electrically-actuated motor(s), a hybrid system, etc., which may enable the modular shopping structure 100 to move from the source location to the destination location. Furthermore, the compartment 110 may be programmed to operate in a fully autonomous (e.g., driverless) mode.

The modular shopping structure 100 may further include a compartment docking unit (shown as compartment docking unit 628 in FIG. 6) that may move the compartment 110 between the compartment elevated position and the compartment docking position. The compartment docking unit may be hydraulically actuated. The compartment docking unit may move the compartment 110 in the compartment elevated position when the compartment 110 may be moving, and the compartment docking unit may move the compartment 110 in the compartment docking position when the compartment 110 reaches the destination location and/or when the compartment 110 may be stationary. The details of the compartment elevated position and the compartment docking position are described below in conjunction with FIGS. 2A and 2B.

Figure 2A:
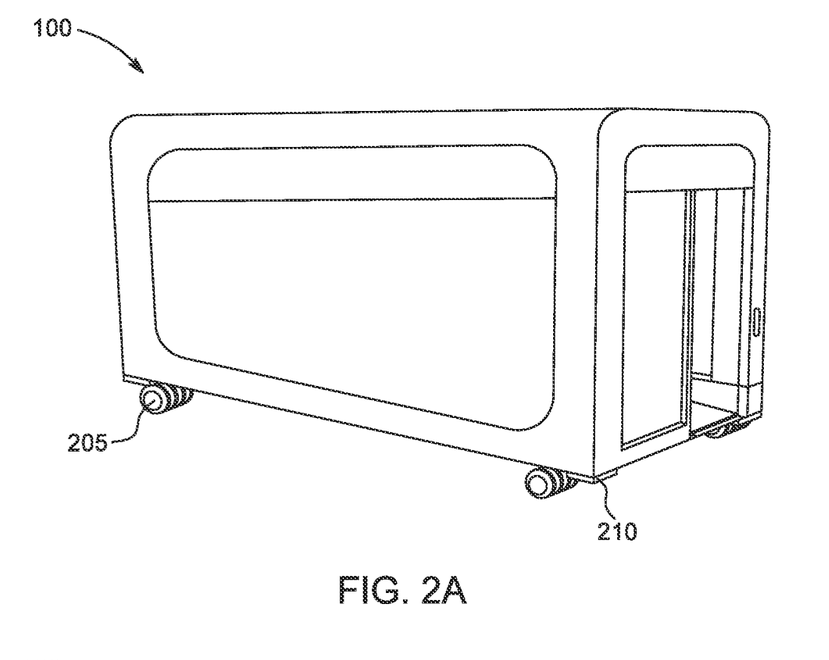
FIGS. 2A and 2B depict example snapshots of a compartment elevated position and a compartment docking position in accordance with the present disclosure.
Figure 2B:
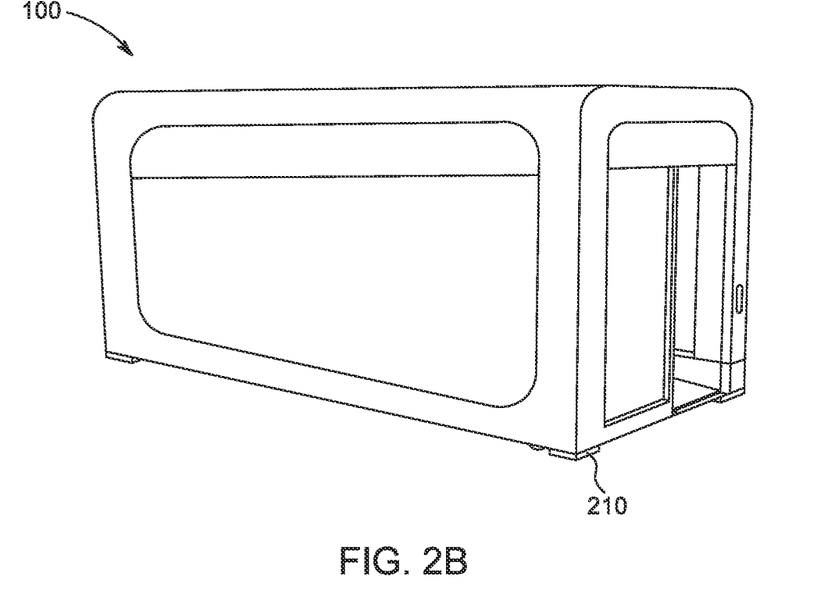

FIGS. 2A and 2B depict example snapshots of a compartment elevated position and a compartment docking position in accordance with the present disclosure. Specifically, FIG. 2A depicts the compartment 110 in the compartment elevated position, and FIG. 2B depicts the compartment 110 in the compartment docking position. While describing FIGS. 2A and 2B, references may be made to FIG. 3 that depicts a view of the compartment bottom portion 305 in accordance with the present disclosure.

The compartment 110 may include a plurality of wheels 205 and a plurality of support structures 210 disposed at the compartment bottom portion 305, as shown in FIGS. 2A, 2B and 3. In some aspects, the compartment 110 may include four support structures, and each support structure may be disposed at each compartment 110 corner (e.g., in proximity to the plurality of wheels 205). The support structures 210 may be of any shape and size. For example, the support structures 210 may be square or rectangular, and may have a thickness in a range of 3 to 9 inches. Length and/or width of each support structure may depend on compartment length and/or width. Further, the support structures 210 may be made of any material including, but not limited to, aluminum, steel, wood, and/or the like. The support structures 210 may be configured to provide support and stability to the compartment 110, when the compartment 110 may be rested on ground.

In the compartment elevated position, the compartment 110 (specifically the compartment bottom portion) may be positioned a predefined distance away from the ground, and the modular shopping structure 100 may be positioned (or moving) on the ground by using the plurality of wheels 205. Stated another way, in the compartment elevated position, the modular shopping structure 100 may have the plurality of wheels 205 touching the ground. In some aspects, the plurality of wheels 205 may be completely visible in the compartment elevated position, as shown in FIG. 2A. Further, in the compartment elevated position, the support structures 210 may be in an elevated position and may not touch the ground.

In the compartment docking position, the compartment 110 (specifically the compartment bottom portion 305) may be rested on the ground via the support structures 210, and the plurality of wheels 205 may not touch the ground. Specifically, the compartment docking unit may move the compartment down from the compartment elevated position (e.g., by using hydraulic components) to the compartment docking position such that the compartment 110 may rest on the ground using the support structures 210 in the compartment docking position. In the compartment docking position, the compartment bottom portion 305 may completely (or partially) enclose the plurality of wheels 205, as shown in FIG. 3. The compartment bottom portion 305 may include a plurality of cavities 310 that may enclose the plurality of wheels 205. In some aspects, the compartment bottom portion 305 may include four cavities for four wheels 202. Stated another way, the compartment bottom portion 305 may include one cavity for each wheel. The cavity may have a size that may correspond to wheel size, and may hence enclose the wheel when the compartment docking unit moves the compartment 110 from the compartment elevated position to the compartment docking position.

A control system (e.g., the system 600 shown in FIG. 6) may be configured to control the compartment docking unit, which may in turn move the compartment 110 between the compartment elevated position and the compartment docking position based on inputs received from the control system. The functions of the control system are described in detail in conjunction with FIG. 6.

Figure 4:
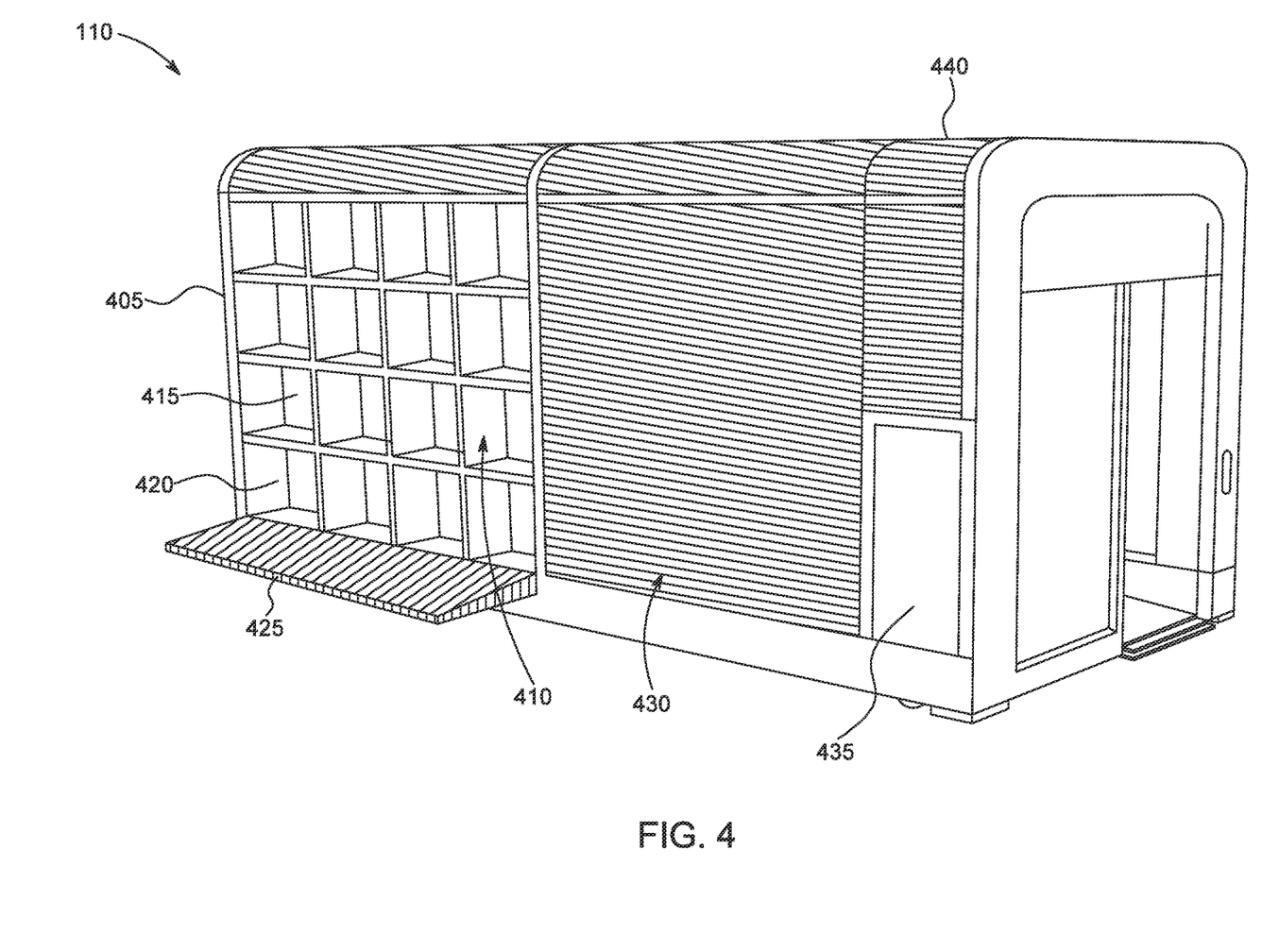
FIG. 4 depicts an example compartment back portion in accordance with the present disclosure.

FIG. 4 depicts an example back portion 405 of the compartment 110 in accordance with the present disclosure. The back portion 405 may include a stock room 410 that may include a plurality of cabinets/shelves 415 that may of any shape and size. The plurality of cabinets 415 may be configured to store products (e.g., surplus items or other items) that may not be accessible to the user 105. The plurality of cabinets 415 may be covered by a shutter or a cover (not shown) that may be locked, and may be accessed by a modular shopping structure operator.

The back portion 405 may further include a docking garage 420 configured to store delivery robots (not shown) with recharge capabilities. The docking garage 420 may include a door 425 or cover 425 to close the docking garage 420. In some aspects, the stock room 410 and the docking garage 420 may be located towards exit of the compartment 110, as shown in FIG. 4.

The back portion 405 may include a mechanical room 430 that may be configured to store mechanical items/equipment, water tank, and/or and other equipment that may be required for proper functioning of the modular shopping structure 100. The mechanical room 430 may be covered by another shutter or cover that may be locked, and may be accessed by the modular shopping structure operator. In some aspects, stock room 410 dimensions (e.g., length, width, depth) may be equivalent to mechanical room 430 dimensions. In other aspects, the stock room 410 dimensions may be different from the mechanical room 430.

The back portion 405 may further include a land delivery module 435 configured to receive automated land delivery. In some aspects, the land delivery module 435 may be located adjacent to the mechanical room 430. The back portion 405 may further include an aerial delivery module 440 that may be located above the land delivery module 435, for example, in a compartment top portion.

Back portion view (as shown in FIG. 4) is shown just for illustrative purpose, and should not be construed as limiting the present disclosure scope. The back portion 405 may have a different structure and may include portions different from the portions mentioned above, without departing from the present disclosure scope.

In some aspects, the modular shopping structure 100 may have modular physical connection that may enable the modular shopping structure 100 to connect with another modular shopping structure. Stated another way, an operator associated with the modular shopping structure 100 may install multiple modular shopping structures at one location, which may be interconnected using the modular physical connection.

Figure 5:
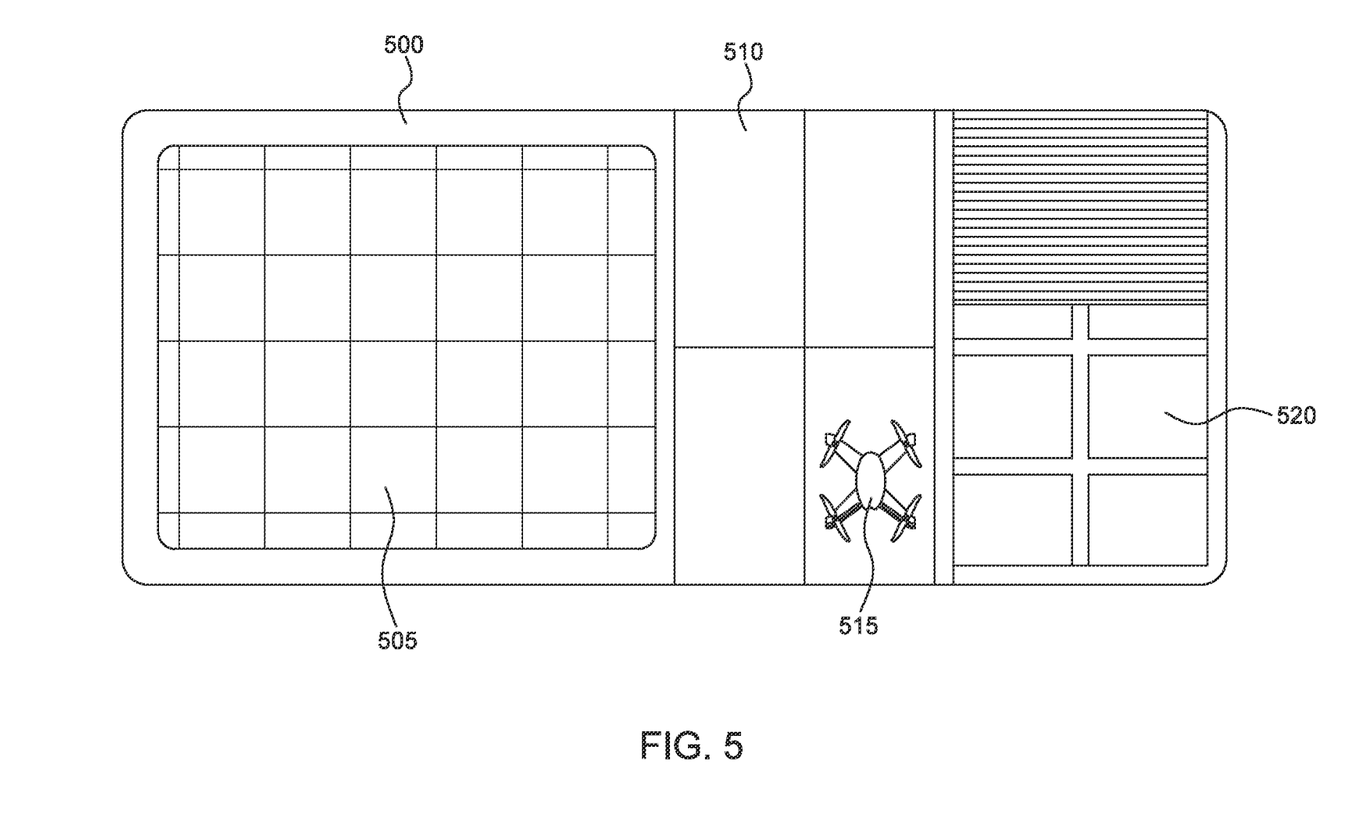
FIG. 5 depicts an example compartment top portion in accordance with the present disclosure.

FIG. 5 depicts an example compartment top portion 500 (i.e., a top portion 500 of the compartment 110) in accordance with the present disclosure. The top portion 500 may be same as the top portion 135. The top portion 500 may include solar panels 505 that may be configured to generate electricity by using solar energy, as described in conjunction with FIG. 1.

The top portion 500 may further include a plurality of landing pads 510 for drones such as a drone 515. In addition, the top portion 500 may include a stock space 520 for aerial delivery.

Figure 6:
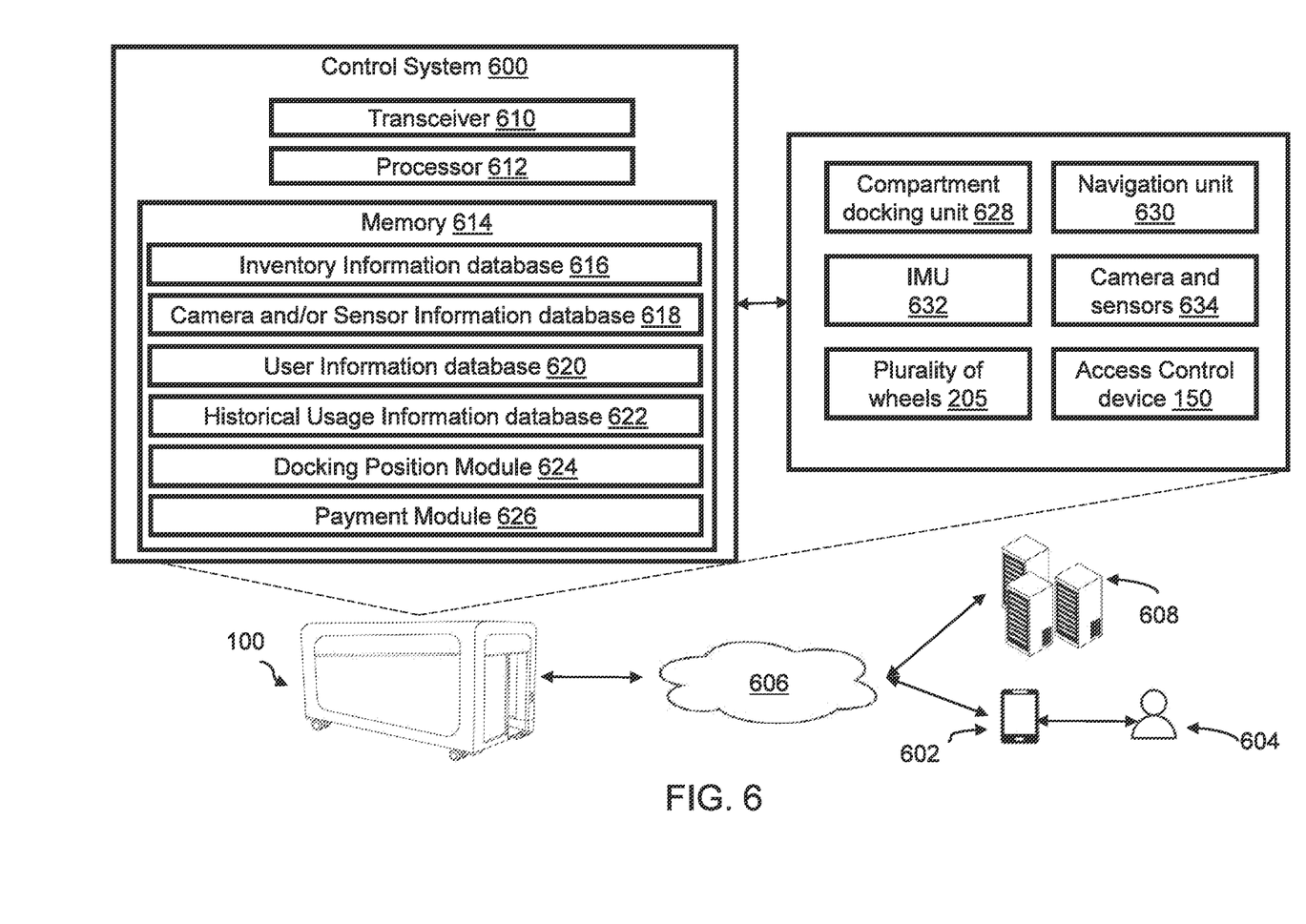
FIG. 6 depicts a block diagram of an example control system in accordance with the present disclosure.

FIG. 6 depicts a block diagram of an example control system 600 (or system 600) in accordance with the present disclosure. The system 600 may be same as the control system described above, and may be disposed in the modular shopping structure 100 (e.g., in the compartment 110). As shown in FIG. 6, in addition to the components described above, the modular shopping structure 100 may further include a compartment docking unit 628, a navigation unit 630, an Inertial Measurement Unit (IMU) 632, and camera and sensors 634. The system 600 may communicatively couple with different components of the modular shopping structure 100. Further, the system 600 may communicatively couple with a user device 602 (associated with a user 604) via a network 606. The user 604 may be same as the user 105.

The network 606 may be, for example, a communication infrastructure in which the connected devices discussed in various embodiments of this disclosure may communicate. The network 606 may be and/or include the Internet, a private network, public network or other configuration that operates using any one or more known communication protocols such as, for example, transmission control protocol/Internet protocol (TCP/IP), Bluetooth, BLER, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The system 600 may further communicatively couple with one or more servers 608 (or a server 608) via the network 606. The server 608 may be part of a cloud-based computing infrastructure, and may be associated with and/or include a Telematics Service Delivery Network (SDN) that provides digital data services to the modular shopping structure 100. In an exemplary aspect, the server 608 may be associated with a firm or an entity that operates the modular shopping structure 100. In some aspects, the modular shopping structure 100 may be configured to interact with another modular shopping structure via the server 608. For example, the modular shopping structure 100 may interact with other modular shopping structures for security purposes or for increasing efficiency (such as footfall) of the modular shopping structures. In additional aspects, the server 608 may be associated with a navigation service provider and may provide navigation services to the modular shopping structure 100.

The system 600 may include one or more components or units including, but not limited to, a transceiver 610, a processor 612, and a memory 614. In some aspects, the memory 614 may store programs in code and/or store data for performing various system 600 operations in accordance with the present disclosure. Specifically, the processor 612 may be configured and/or programmed to execute computer-executable instructions stored in the memory 614 for performing various system 600 functions in accordance with the disclosure. Consequently, the memory 614 may be used for storing code and/or data code and/or data for performing operations in accordance with the present disclosure.

In one or more aspects, the processor 612 may be disposed in communication with one or more memory devices (e.g., the memory 614 and/or one or more external databases (not shown in FIG. 6)). The memory 614 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The memory 614 may be one example of a non-transitory computer-readable medium and may be used to store programs in code and/or to store data for performing various operations in accordance with the present disclosure. The instructions in the memory 614 can include one or more separate programs, each of which can include an ordered listing of computer-executable instructions for implementing logical functions.

In some aspects, the memory 614 may include a plurality of modules and databases including, but not limited to, an inventory information database 616, a camera and sensor information database 618, a user information database 620, a historical usage information database 622, a docking position module 624, and a payment module 626. The docking position module 624 and the payment module 626, as described herein, may be stored in the form of computer-executable instructions, and the processor 612 may be configured and/or programmed to execute the stored computer-executable instructions for performing system 600 functions in accordance with the present disclosure. The functions of the plurality of databases and modules included in the memory 614 are described later in the description below.

The transceiver 610 may be configured to communicate with internal and external devices (e.g., via the network 606). For example, the transceiver 610 may receive inventory information from the server 608 (or any other device connected with the system 600). The inventory information may include details of the plurality of items 120 that may be stored in the compartment 110 including, but not limited to, item name, item price/cost, item type, a count of items, item barcode or identifier information, and/or the like. The transceiver 610 may receive such information and store the information in the inventory information database 616. The inventory information database 616 may be updated regularly. For example, the inventory information database 616 may be updated as and when the user 604 purchases any item from the plurality of items 120 or when new items are loaded on the plurality of shelves 115.

In some aspects, total purchase or usage information associated with the plurality of items 120 may be stored in the historical usage information database 622. For example, the historical usage information database 622 may store information associated with items purchased by a plurality of users from the modular shopping structure 100 in a predefined time duration (e.g., 1 month, 3 months, 6 months etc.). The information may include, for example, a count of items purchased, item names, total cost of the items purchases, and/or the like.

The transceiver 610 may be further configured to receive data or inputs (including video feeds) from the camera(s) and/or sensor(s) 634 disposed in the compartment 110. Such data or inputs may indicate information associated with item(s) (e.g., a first item) picked by the user 604 from a shelf of the plurality of shelves 115. The transceiver 610 may store such data or inputs in the camera and/or sensor information database 618. The transceiver 610 may be further configured to receive user information from the server 608 (or any other connected device). For example, the transceiver 610 may receive the user information when the user 604 registers on the server 608 to use the modular shopping structure 100. The user information may include user name, user unique identifier (user ID), contact details, account details, and/or the like. The transceiver 610 may store such information in the user information database 620. In addition, the transceiver 610 may be further configured to receive the user ID from the access control device 150 when the user 604 scans the user device 602 or the RFID card at the access control device 150.

In further aspects, the transceiver 610 may receive modular shopping structure 100 location/position from the navigation unit 630 located in the modular shopping structure 100, and may be configured to transmit the location/position to the processor 612. The processor 612 may be configured to obtain the location/position, determine compartment state of motion (e.g., whether the compartment 110 may be moving, starting to move, or has reached the destination location) based on inputs received from the navigation unit 630. Responsive to determining the compartment state of motion, the processor 612 may select/control compartment position (e.g., the compartment elevated position or the compartment docking position) by using instructions stored in the docking position module 624.

Specifically, responsive to a determination that the compartment 110 may have reached the destination location (and may not be moving) based on the compartment state of motion, the processor 612 may transmit a first command signal to the compartment docking unit 628 to move the compartment 110 from the compartment elevated position to the compartment docking position. On the other hand, responsive to a determination that the compartment 110 may be starting to move from a stationary/docking position, the processor 612 may transmit a second command signal to the compartment docking unit 628 to move the compartment 110 from the compartment docking position to the compartment elevated position.

In further aspects, the processor 612 may be configured to actuate or trigger modular shopping structure 100 movement. Specifically, the processor 612 may obtain total cost associated with a set of items purchased by a plurality of users in a predefined time duration (e.g., a month, a quarter, or six months) from the historical usage information database 622 when the modular shopping structure 100 may be docked at a first location. Responsive to obtaining the total cost, the processor 612 may compare the total cost with a predefined threshold (that may be pre-stored in the memory 614), and may transmit a third command signal to the plurality of wheels 205 to move the compartment 110 from the first location to a second location when the total cost may be less than the predefined threshold. In this case, the processor 612 may first send a fourth command signal to the compartment docking unit 628 to move the compartment 110 from the compartment docking position to the compartment elevated position at the first location. Thereafter, the processor 612 may send the third command signal to the plurality of wheels 205 to move the compartment 110 from the first location to the second location. When the compartment 110 reaches the second location, the processor 612 may transmit the first command signal to the compartment docking unit 628 to move the compartment 110 from the compartment elevated position to the compartment docking position.

In some aspects, the second location may be pre-stored in the memory 614, and the processor 612 may fetch the second location from the memory 614 before transmitting the third command signal to the plurality of wheels 205. In other aspects, the user device 602 may transmit the second location to the system 600 (and hence the processor 612), via the network 606 and the transceiver 610. In an exemplary aspect, the second location may be a location where footfall to the modular shopping structure 100 may be expected to be higher than footfall in the first location.

In further aspects, the processor 612 may obtain inputs from the IMU 632 that may be configured to detect compartment inclination. Stated another way, the IMU 632 may be configured to determine whether the compartment 110 may be docked on a level ground or an inclined plane. Responsive to obtaining the inputs, the processor 612 may determine that the compartment 110 may be inclined. The processor 612 may be further configured to transmit a fifth command signal to the compartment docking unit 628 to level the compartment 110 when the compartment 110 may be inclined.

In some aspects, when the modular shopping structure 100 may have reached the destination location (e.g., the second location) and the compartment 110 may be in the compartment docking position, the modular shopping structure 100 may allow the user 604 to access the compartment 110. In this case, when the user 604 approaches in proximity to the modular shopping structure 100, the user 604 may scan the user device 602 (or an RFID card) at the access control device 150. The access control device 150 may transmit user ID associated with the user 604 to the processor 612, via the transceiver 610. Responsive to obtaining the user ID from the access control device 150, the processor 612 may fetch user information associated with the user ID from the user information database 620. The processor 612 may then authenticate the user 604 based on the user information, and may grant access to the user 604 based on the authentication.

The user 604 may enter the compartment 110 when the processor 612 grants access to the user 604. The compartment camera(s) and sensors 634 may detect a user purchase action associated with the first item when the 604 picks the first item from the plurality of shelves 115. The user purchase action may include user picking the first item from the plurality of shelves 115 and/or placing the first item in a shopping bag. The camera(s) and sensors 534 may transmit the user purchase action to the processor 612, via the transceiver 610.

Responsive to obtaining the user purchase action from the camera(s) and sensors 634, the processor 612 may determine a cost associated with the first item. For example, the processor 612 may fetch cost of the first item from the inventory information database 616, when the user 604 picks the first item. In another example, when the user 604 picks multiple items, the processor 612 may fetch cost of each item from the inventory information database 616 and calculate a total cost for the items picked by the user 604. The processor 612 may then initiate a payment process. Specifically, the processor 612 may transmit, via the payment module 626, a payment command signal to an external third party payment module (not shown) to deduct the cost associated with the first item from an account associated with the user 604. The payment command signal may include the cost to be deducted from the account associated with the user 604. Responsive to receiving the payment command signal, the third party payment module may deduct the cost from the account associated with the user 604.

In this manner, the user 604 may not have to get the items scanned and make the payment in an offline/physical payment counter. By using the modular shopping structure 100, the user 604 may simply collect/pick the items and leave the modular shopping structure 100 and the payment may be performed automatically. In a scenario where the money in the account may be less than the cost of the first item, the processor 612 may output an alarm or alert (e.g., audio or visual alarm on compartment display screens) for the user 604. Responsive to receiving the alarm, the user 604 may add money to the account associated with the user 604.

In further aspects, the transceiver 610 may be configured to receive signals from the emergency buttons disposed in the compartment 110 (e.g., when the user 604 actuates/presses the emergency buttons). The transceiver 610 may be further configured to transmit the signals to the processor 612. The processor 612 may obtain the signals and may perform one or more predefined actions. For example, when the user 604 presses the panic button, the processor 512 may obtain a first signal from the panic button, via the transceiver 610. Responsive to obtaining the first signal, the processor 612 may perform a first predefined action. The first predefined action may include locking the compartment 110 (e.g., the entry area 140) so that no intruder may enter the compartment 110. The first predefined action may further include calling a third party (e.g., police) via the network 606 and the transceiver 610.

In another example, when the user 604 presses the medical emergency button, the processor 612 may obtain a second signal from the medical emergency button, via the transceiver 610. Responsive to obtaining the second signal, the processor 612 may perform a second predefined action. The second predefined action may include calling a third party (e.g., an ambulance) via the network 606 and the transceiver 610. In this case, the processor 612 may not lock the compartment 110.

Figure 7:
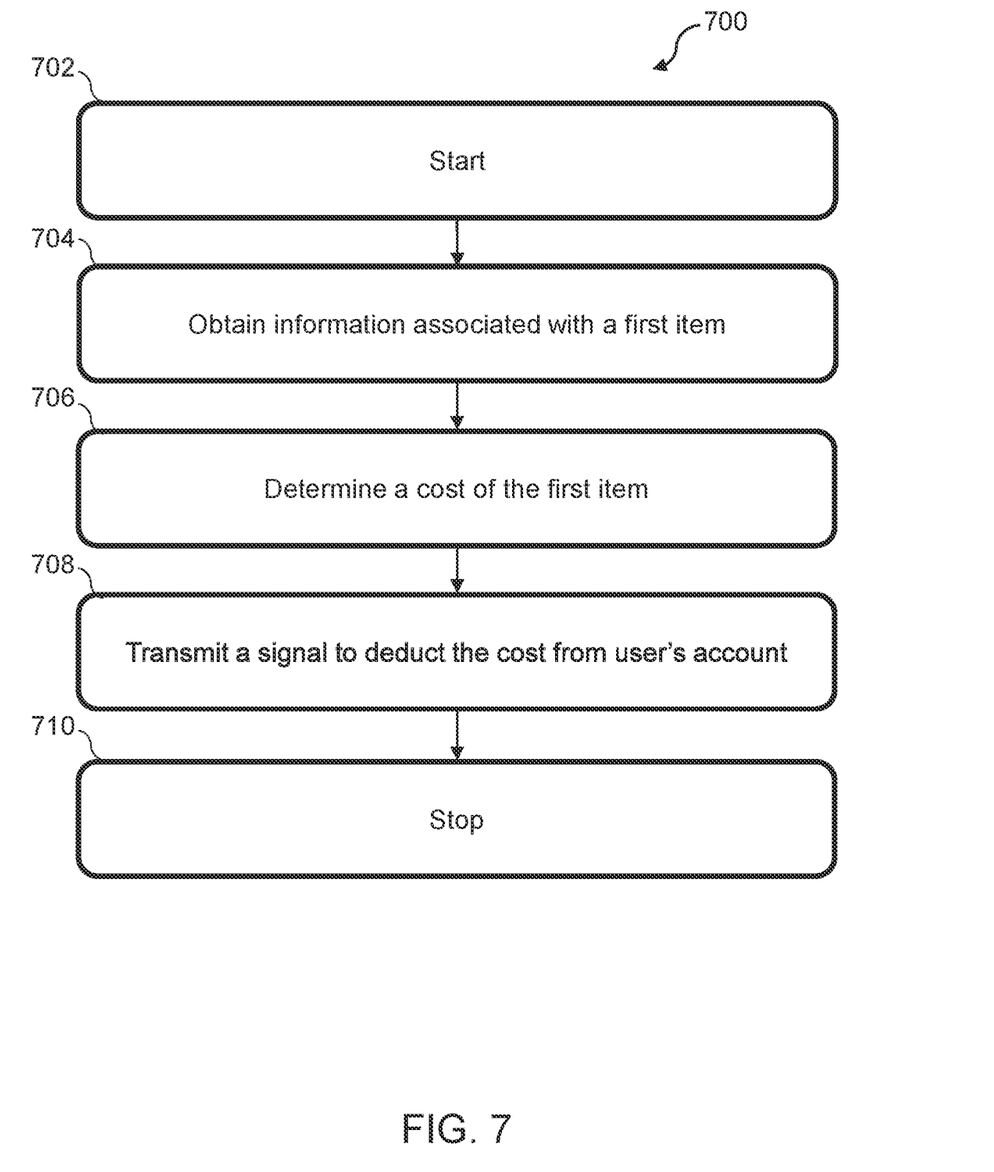
FIG. 7 depicts a flow diagram of an example method to purchase an item in a modular shopping structure in accordance with the present disclosure.

FIG. 7 depicts a flow diagram of an example method 700 to purchase an item in the modular shopping structure 100 in accordance with the present disclosure. FIG. 7 may be described with continued reference to prior figures, including FIGS. 1-6. The following process is exemplary and not confined to the steps described hereafter. Moreover, alternative embodiments may include more or less steps that are shown or described herein and may include these steps in a different order than the order described in the following example embodiments.

Referring to FIG. 7, at step 702, the method 700 may commence. At step 704, the method 700 may include obtaining, by the processor 612, information associated with a first item of the plurality of items 120. Specifically, the processor 612 may receive a signal associated with a user purchase action from the camera(s) and/or sensors installed in the compartment 110. The user purchase action may indicate that the user 604 may have picked the first item from the compartment 110. Responsive to obtaining the user purchase action, the processor 612 may obtain information associated with the first item from the inventory information database 616.

At step 706, the method 700 may include determining, by the processor 612, a cost associated with the first item based on the obtained information, as described above. At step 708, the method 700 may include transmitting, by the processor 612, a command signal to a third party payment module to deduct the cost from user's account. Specifically, the processor 612 may fetch user account details from the user information database 620 and may send the command signal to the third party payment module to deduct the cost from the user's account.

The method 700 may stop at step 710.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A modular shopping structure comprising:
a compartment configured to store a plurality of items;
a plurality of wheels disposed at a compartment bottom portion, wherein the plurality of wheels are configured to move the compartment from a source location to a destination location;
a compartment docking unit configured to move the compartment between a compartment elevated position and a compartment docking position, wherein the compartment is in the compartment elevated position when the compartment is moving, wherein the compartment is in the compartment docking position when the compartment reaches the destination location, and wherein the compartment bottom portion is moved in proximity to ground in the compartment docking position;
a sensor configured to detect a user purchase action associated with a first item, of the plurality of items, when the compartment is in the compartment docking position; and
a processor communicatively coupled to the sensor, wherein the processor is configured to:
obtain the source location and the destination location;
determine that the compartment has reached the destination location via a navigation unit associated with the modular shopping structure;
transmit a first command signal to the compartment docking unit to move the compartment from the compartment elevated position to the compartment docking position responsive to a determination that the compartment has reached the destination location, wherein a compartment bottom interior portion is configured to partially or completely enclose the plurality of wheels in the compartment docking position;
obtain information associated with the first item when the sensor detects the user purchase action;
determine a cost associated with the first item based on the information; and
transmit a second command signal to a third party payment module to deduct the cost from an account associated with a user.

2. The modular shopping structure of claim 1, wherein the compartment docking unit is hydraulically actuated.

3. The modular shopping structure of claim 1, wherein the sensor is a compartment interior camera or a radio frequency identification (RFID) reader.

4. The modular shopping structure of claim 1, wherein the user purchase action comprises the user picking the first item from a compartment shelf.

5. The modular shopping structure of claim 1 further comprising a memory configured to store the information associated with the first item, wherein the information comprises a first item name and the cost, and wherein the processor is configured to obtain the information from the memory.

6. The modular shopping structure of claim 1 further comprising a panic button disposed at a compartment interior portion, wherein the processor is configured to:
obtain a first signal from the panic button when the user actuates the panic button; and
perform a first predefined action responsive to obtaining the first signal.

7. The modular shopping structure of claim 1 further comprising a medical emergency button disposed at a compartment interior portion, wherein the processor is configured to:
obtain a second signal from the medical emergency button when the user actuates the medical emergency button; and
perform a second predefined action responsive to obtaining the second signal.

8. The modular shopping structure of claim 1, wherein the processor is further configured to:
calculate a total cost associated with a set of second items, of the plurality of items, purchased by a set of users in the destination location in a predefined time duration;
compare the total cost with a predefined threshold; and
transmit a third command signal to the plurality of wheels to move the compartment to another destination location when the total cost is less than the predefined threshold.

9. The modular shopping structure of claim 1 further comprising an inertial measurement unit (IMU) configured to detect compartment inclination, wherein the processor is further configured to:
obtain inputs from the IMU;
determine that the compartment is inclined based on the inputs; and
transmit a fourth command signal to the compartment docking unit to level the compartment responsive to a determination that the compartment is inclined.

10. A method to purchase a first item, of a plurality of items, from a modular shopping structure, the method comprising:
obtaining, by a processor, a source location and a destination location;
determining, by the processor, that a compartment of the modular shopping structure has reached the destination location via a navigation unit associated with the modular shopping structure;
transmitting, by the processor, a first command signal to a compartment docking unit to move the compartment from a compartment elevated position to a compartment docking position responsive to a determination that the modular shopping structure has reached the destination location, wherein a compartment bottom interior portion is configured to partially or completely enclose a plurality of wheels in the compartment docking position;
obtaining, by the processor, information associated with the first item when a sensor detects a user purchase action associated with the first item, wherein:
the plurality of items is stored in the compartment of the modular shopping structure, the modular shopping structure comprises the plurality of wheels disposed at a compartment bottom portion, wherein the plurality of wheels are configured to move the compartment from the source location to the destination location, the modular shopping structure further comprises the compartment docking unit configured to move the compartment between the compartment elevated position and the compartment docking position, wherein the compartment is in the compartment elevated position when the compartment is moving, wherein the compartment is in the compartment docking position when the compartment reaches the destination location, and wherein the compartment bottom portion is moved in proximity to ground in the compartment docking position, and the sensor detects the user purchase action when the compartment is in the compartment docking position;

determining, by the processor, a cost associated with the first item based on the information; and transmitting, by the processor, a second command signal to a third party payment module to deduct the cost from an account associated with a user.

11. The method of claim 10, wherein the compartment docking unit is hydraulically actuated.

12. The method of claim 10, wherein the sensor is a compartment interior camera or a radio frequency identification (RFID) reader.

13. The method of claim 10, wherein the user purchase action comprises the user picking the first item from a compartment shelf.

14. The method of claim 10 further comprising:
calculating a total cost associated with a set of second items, of the plurality of items, purchased by a set of users in the destination location in a predefined time duration;
comparing the total cost with a predefined threshold; and
transmitting a third command signal to the plurality of wheels to move the compartment to another destination location when the total cost is less than the predefined threshold.

15. A non-transitory computer-readable storage medium having instructions stored thereupon which, when executed by a processor, cause the processor to:
obtain a source location and a destination location;
determine that a compartment of a modular shopping structure has reached the destination location via a navigation unit associated with the modular shopping structure;
transmit a first command signal to a compartment docking unit to move a compartment from a compartment elevated position to a compartment docking position responsive to a determination that the modular shopping structure has reached the destination location, wherein a compartment bottom interior portion is configured to partially or completely enclose a plurality of wheels in the compartment docking position;
obtain information associated with an item, of a plurality of items, in a modular shopping structure when a sensor detects a user purchase action associated with the item, wherein:
the plurality of items is stored in the compartment of the modular shopping structure, the modular shopping structure comprises the plurality of wheels disposed at a compartment bottom portion, wherein the plurality of wheels are configured to move the compartment from the source location to the destination location,
the modular shopping structure further comprises the compartment docking unit configured to move the compartment between the compartment elevated position and the compartment docking position, wherein the compartment is in the compartment elevated position when the compartment is moving, wherein the compartment is in the compartment docking position when the compartment reaches the destination location, and wherein the compartment bottom portion is moved in proximity to ground in the compartment docking position, and
the sensor detects the user purchase action when the compartment is in the compartment docking position;
determine a cost associated with the item based on the information; and
transmit a second command signal to a third party payment module to deduct the cost from an account associated with a user.

16. The non-transitory computer-readable storage medium of claim 15, wherein the compartment docking unit is hydraulically actuated.

* * * * *